United States Patent [19]

Bonny

[11] 4,392,419
[45] Jul. 12, 1983

[54] COOKING AND SMOKING APPARATUS

[76] Inventor: Weldon D. Bonny, R.D. 1, Dalton, Pa. 18414

[21] Appl. No.: 133,795

[22] Filed: Mar. 25, 1980

[51] Int. Cl.³ .............................................. A47J 37/04
[52] U.S. Cl. ........................................ 99/339; 99/352; 99/422
[58] Field of Search ...................... 99/352, 339, 443 R, 99/444, 446, 479, 482; 126/9, 25, 389; 312/301, 330 R, 348

[56] References Cited

U.S. PATENT DOCUMENTS

| | | | |
|---|---|---|---|
| 1,232,802 | 7/1917 | Hórniachek | 180/183 |
| 1,948,937 | 2/1934 | De Muth | 126/268 |
| 2,265,421 | 12/1941 | Donnelly | 99/443 R |
| 2,493,295 | 1/1950 | Kron | 248/352 |
| 2,589,073 | 3/1952 | Gilbert | 126/2 |
| 2,603,500 | 7/1952 | Messier | 296/22 |
| 2,626,559 | 1/1953 | Rau | 99/352 |
| 2,851,941 | 9/1958 | Cogar | 99/352 |
| 3,019,720 | 2/1962 | Topper | 99/339 |
| 3,025,782 | 3/1962 | Stall | 99/339 |
| 3,029,754 | 4/1962 | Doyle | 126/25 R X |
| 3,124,057 | 3/1964 | Kiser | 126/9 R X |
| 3,267,835 | 8/1966 | Romano et al. | 99/443 R X |
| 3,286,620 | 11/1966 | Brown | 99/446 |
| 3,380,444 | 4/1968 | Stalker | 126/9 R X |
| 3,419,255 | 12/1968 | Carel et al. | 99/443 R X |

FOREIGN PATENT DOCUMENTS 13924 6/1956 Fed. Rep. of Germany ........ 99/482

Primary Examiner—Harvey C. Hornsby
Assistant Examiner—Frankie L. Stinson
Attorney, Agent, or Firm—Arthur G. Yeager

[57] ABSTRACT

A portable and trailerable cooking and smoking apparatus comprising a housing enclosing the cooking and smoking space; a perforated shelf inside the housing in the upper portion thereof for supporting materials to be cooked or smoked; a slideable drawer capable of being selectively positioned from entirely within the housing to entirely outside the housing and serving as a fire box with an adjustable damper, and with an outlet in the rear portion thereof for the passage of smoke into the internal space of the housing; and a smoke outlet in the housing upper portion.

14 Claims, 5 Drawing Figures

U.S. Patent
Jul. 12, 1983
4,392,419
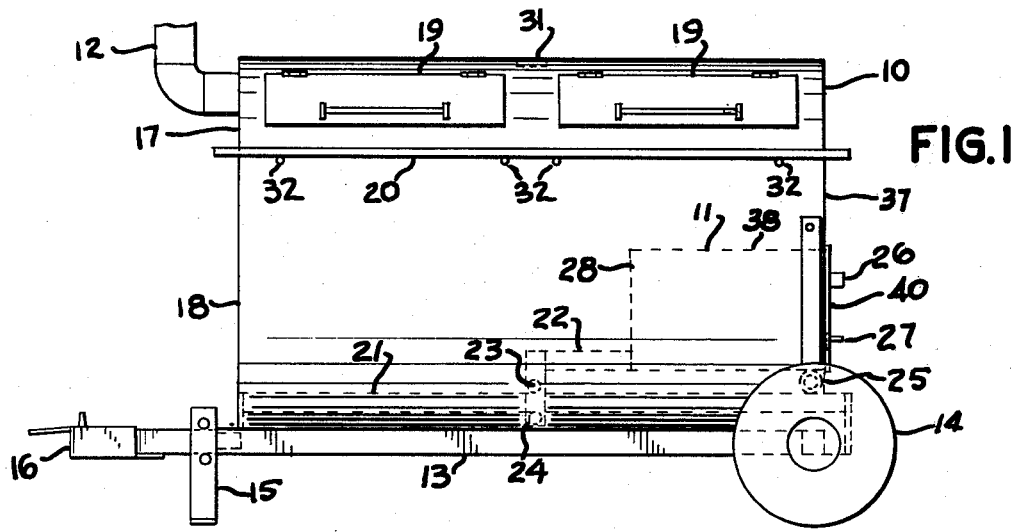
FIG. 1
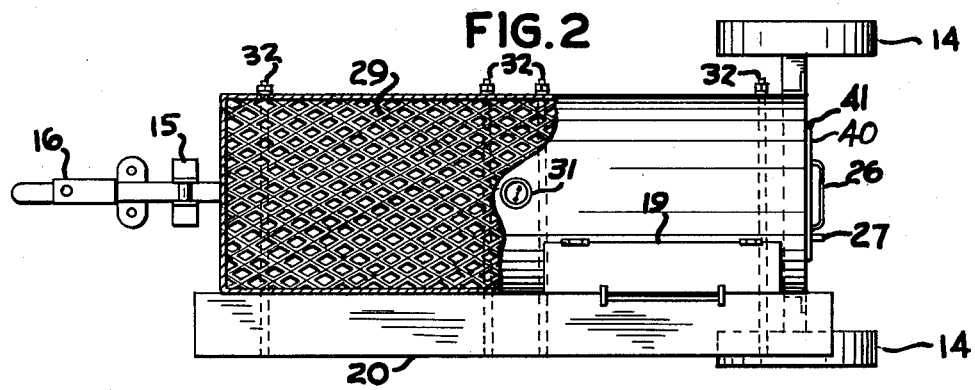
FIG. 2
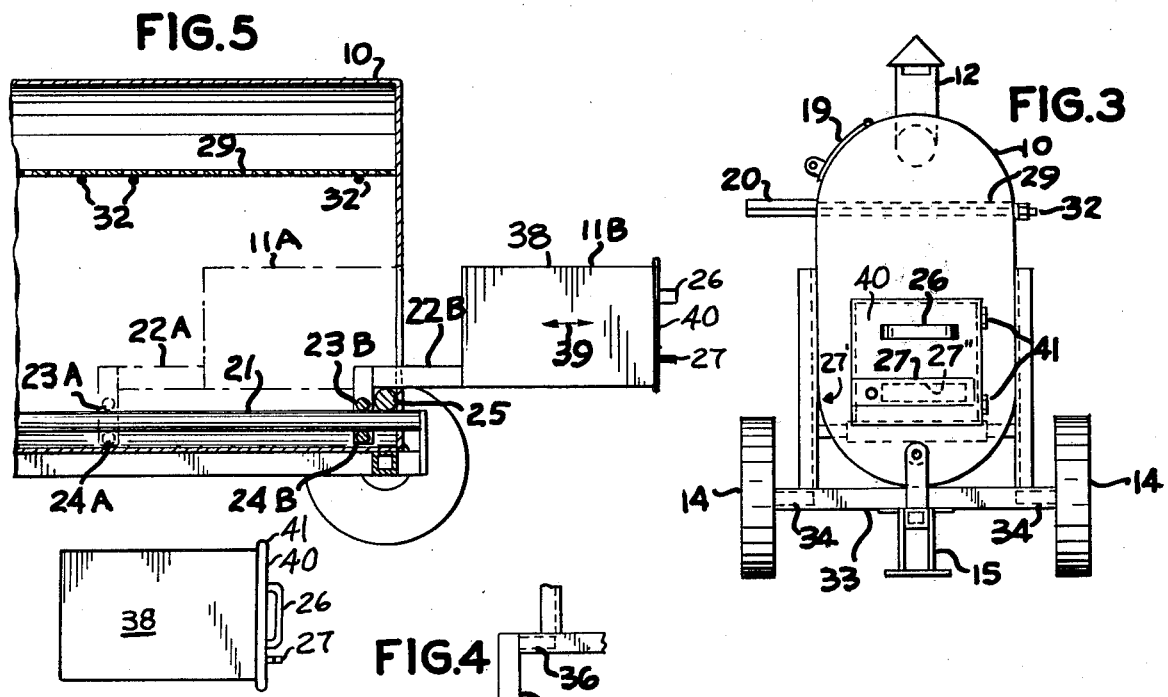
FIG. 5
FIG. 3
FIG. 6
FIG. 4

COOKING AND SMOKING APPARATUS

BACKGROUND OF THE INVENTION

Various ways of cooking and of smoking all types of meat have been known for hundreds of years in order to prepare food for human consumption. Cooking and smoking ovens have been made portable in order to move them from place to place wherever needed. Portable units that have been mounted on a wheeled frame in order to be pulled around like a trailer have usually been made in a sturdy simple design. Such devices mounted on a trailer frame find use in camps or other outdoor living quarters which are not convenient to modern facilities for storing and cooking food. Furthermore, such devices have normally been of a simple uncomplicated design which leaves much to be desired in the means for adjusting the amount of heat and the amount of smoke for any of several types of materials to be smoked or cooked, for any of several types of fuel to be employed, and for various atmospheric conditions.

It is an object of this invention to provide a portable, and trailerable cooking and smoking apparatus which is sufficiently rugged to be transported in the manner of a trailer and yet having means to adjust the amount of heat and the amount of smoke for a wide variety of conditions as required by the cook. It is another object of this invention to provide a cooking and smoking apparatus having a movable firebox which will adjust the amount of heat and smoke available inside the apparatus as required by the cook. Other objects of this invention are to provide a fire box which is movable to a position partly or fully outwardly of the housing whereby the closed top thereof may be used as a grill or stove top; and is movable completely outwardly to permit cleaning of the housing lower portion in which the meat drippings, from the upper shelf portion.

BRIEF SUMMARY OF THE INVENTION

This invention provides a cooking and smoking apparatus comprising a housing enclosing a cooking and smoking space having an upper portion and a lower portion; a perforated shelf inside the housing in the upper portion for supporting materials to be cooked or smoked. A first opening in the upper portion of the housing adjacent one end portion serves as a smoke outlet; a second opening in the lower portion of the housing; is located adjacent another end portion an enclosed drawer is slideable in and out of second opening and has a transverse cross section substantially complemental to the second opening, a flat horizontal and closed top surface, said drawer comprising an access door to its interior for the introduction of fuel and a damper means in the access door, and an exit passageway in the drawer to conduct heat and smoke to the interior of the housing. In one embodiment of this invention the housing includes a frame to which alternatively may be attached wheels for transporting the housing from place to place or stationary legs for supporting the housing in a fixed position. In another embodiment of this invention the drawer serving as a fire box is attached by a rigid arm to roller means which travel on a horizontal rail in the lower portion of the housing and thus permit the drawer to be moved horizontally inwardly or outwardly of the housing and to dispose the fire box sufficiently outwardly to permit cleaning within the housing lower portion.

BRIEF DESCRIPTION OF THE DRAWINGS

The novel features believed to be characteristic of this invention are set forth with particularly in the appended claims The invention, itself, however, both as to its organization and method of operation, together with further objects and advantages thereof, may best be understood by reference to the following description taken in connection with the accompanying drawings in which:

FIG. 1 is a side view in elevation of the cooking and smoking apparatus of this invention.

FIG. 2 is a top plan view of the apparatus of this invention with the outside portion of the housing removed to clearly view the internal parts thereof.

FIG. 3 is a front elevational view of the apparatus of this invention.

FIG. 4 is an illustration of a stationary leg which may be employed in place of a wheel to render the apparatus fixed rather than portable.

FIG. 5 is a partial cross section view taken along line 5—5 in FIG. 3 to show several selective positions of the fire box of this apparatus.

FIG. 6 is a top plan view of the upper surface of the moveable firebox drawer.

DETAILED DESCRIPTION OF THE INVENTION

By specific reference to FIGS. 1-3 the features and capabilities of this invention may best be understood.

Housing 10 encloses an interior space for cooking or smoking of goods, such as meat, vegetables, breads, etc. Housing 10 is comprised of an upper portion 17 in which the materials to be cooked or smoked are placed, and a lower portion 18 in which the heat and smoke are generated. In upper portion 17 there is located smoke outlet 12, normally in the form of a short smoke stack adjacent one end portion of housing 10. Also located in upper portion 17 are one or more access doors 19 which permit the cook to insert the goods to be cooked, to view goods being cooked or smoked and to move them around on an internal shelf or rack 29 as desired for initial cooking or smoking. An outer shelf 20 supported on transverse rods 32, which likewise support rack 29, is provided as a convenient working surface for cooking utensils and for the goods which are introduced into the oven or removed therefrom.

Lower portion 18 is a complete enclosure except for an opening in the front end wall 37 to permit a slideable drawer 11 to be moved inwardly and outwardly from the internal portions of housing 10. Drawer 11 serves as the firebox in which the heat and smoke are generated by burning wood or other convenient fuel. Drawer 11 is any convenient shape which has a flat uninterrupted upper surface 38, and comprises a selectively movable damper 27, a passageway 28 for conducting smoke and heat into the internal space of housing 10, and means in the form of an access door 40 hingedly mounted at 41 to the drawer for loading fuel into the internal portions of drawer 11. In the embodiment shown in these drawings drawer 11 has the shape of a rectangular prism with handle 26 on the front door 40 thereof and rigid arm 22 extending from the rear wall 28 thereof to serve as a cantilever support for sliding the drawer inwardly and outwardly.

The movement of drawer 11 is accomplished in the illustrated embodiment of this invention by means of upper roller 23 and lower roller 24 on the end of rigid arm 22 cooperating with horizontal fixed rail 21 in the lower portion 18 of housing 10. Roller 25 which is located adjacently inwardly of wall 37 of housing 10, also serves as a support for the movement of drawer 11. It may be seen by these roller means 23,24 and 25 drawer 11 can readily be moved inwardly and outwardly to any convenient selected location. When all the possible heat and smoke are desired internally in housing 10 the drawer may be moved as far inwardly as possible to the point where the front access door of drawer 11 is substantially flush against front end wall 37 of housing 10 or generally within the same plane as end wall 37. In this connection it is likely that the damper 27 may be completely open to maximize the fuel within the fire box. When a lesser amount of heat and smoke is desired drawer 11 may be moved outwardly from housing 10, with or without closing of damper 27, thus permitting some of the heat in drawer 11 to be dissipated externally of housing 10.

Damper 27 may take any of the normal forms that are known which permit more of less air to be admitted to the fire. In this invention it is desirable to have damper 27, shown to be fully closed in FIG. 3, adjustable and in the form of a sliding door movable in the direction of arrow 27' to expose the opening 27" which communicates between the outside air and the firebox. The damper 27 accordingly will adjust the heat being generated as well as the rate of burning of the fuel within the firebox.

It is readily understood that drawer 11 may be of any particular shape in cross section so long as it can be slidingly positioned inwardly and outwardly of housing 10. It is preferred that upper surface 38 of drawer 11 be flat and uninterrupted so that it can serve as a cooking grill or surface in addition to that which is accomplished inside of housing 10, namely of shielding the fire from the drippings from the meats, etc., which are being cooked thereby inhibiting flame ups and the like which may tend to burn and/or otherwise interfere with the proper cooking thereof. Thus, when drawer 11 is pulled outwardly of housing 10 upper surface 38 is exposed and made available to serve as the top of the stove or any suitable cooking purposes while at the same time heat and smoke may be generated and supplied to the inside of housing 10 for cooking other goods inside that housing. If drawer 11 is moved completely outside of housing 10, except for outlet 28 communicating within housing 10, it may be employed as a stove without using the internal facilities of housing 10 for cooking or smoking of other goods. Thus, the cooking and smoking apparatus of this invention can be used as a combination heater and/or cooker, with the smokestack extending to the outside of a tent or the like, and the housing 10 and firebox being within the tent. It would then be apparent that adjustment of the firebox 11 can produce several desirable alternatives.

In FIG. 2 there is shown the interior of housing 11 as viewed from above. It may be seen that a perforated shelf 29 rests on transverse supporting rods 32 after the fashion of a grid or grill and upon which food or other goods to be smoked may be supported inside of housing 10. Shelf 29 may take any of several forms such as an expanded metal surface, a network of small rods, a metal sheet perforated with plurality of apertures, etc., so long as it is able to support the goods to be cooked or smoked and to permit the passage of heat and smoke through the perforations of the shelf. The entire housing 10 is conveniently supported on a simple frame 13 to which wheels or legs are detachably secured. In the embodiment shown herein, frame 13 is made in the form of a trailer having two wheels 14 at one end of the frame, a single supporting leg 15 at the other end of the frame, and a trailer hitch device 16 to permit the frame to be attached to a vehicle for transporting same. As seen in FIG. 3, a feature of this invention is the provision of wheels 14 with stub axles 34 to telescope into internal portions of transverse beam 33 and being suitably releasably locked thereto. It may be seen that beam 33 is shown as a hollow square tube with axle 34 being complementary thereto and thereinto whereby relative rotation is prohibited. Accordingly a firm support is provided for each of wheels 14, which are suitably rotatable through the normal bearing and journal construction known to those skilled in the art. If wheels are attached to the frame in this manner, they may be replaced by a rigid legs 35 having identical stub axles 36 to those of stub axles 34. The alternative is thus provided to the operator of the apparatus of having wheels for movement of the apparatus or rigid legs to support the apparatus when it is to be located in a permanent or semi-permanent position.

It is desirable that there be affixed to the upper portions of 17 of housing 10 at some convenient location at least one thermometer 31 which would indicate the internal cooking temperature in housing 10. Furthermore, a drain plug should also be provided in the bottom portion 18 of the housing 10 to permit easy cleaning thereof.

In FIG. 5 the range of selective movement of drawer 11 may be understood. There are shown the two extremes of the movement of drawer 11 from its internal location indicated by broken lines and by "A" attached to the numerals identifying respective parts to its most outwardly extreme position indicated by the "B" attached to the reference numbers of the same parts. Thus drawer 11 A may be selectively moved outwardly to the position 11 B and may be returned to the original position in the direction of arrows 39 by rollers 23 A and 24A rolling on rail 21, with drawer 11 being supported by roller 25 until the rear wall of drawer 11 passes outwardly beyond roller 25. Normally drawer 11 would not extend beyond the point of being supported by roller 25 except for purposes of cleaning the entire top of the firebox and the internal lower portion of housing 10 and/or the underside of perforated shelf 29.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what is desired to secure by Letters Patents of the United States is:

1. A cooking and smoking apparatus comprising a housing enclosing a cooking and smoking space and having an upper portion and a lower portion, a perforated shelf inside said housing in said upper portion for supporting goods to be cooked or smoked, a first opening in said upper portion of said housing for the egress of smoke therefrom, a second opening in said lower portion of said housing, a fire box including an enclosed drawer selectively slideable in and out of said second opening and having a transverse cross section substantially complemental to said second opening, said drawer having a flat horizontal uninterrupted top surface defining an uninterrupted planar cover completely covering said drawer for closing the top of said drawer and providing a cooking surface, an openable and closeable front access door for said drawer, a damper means in communication with the interior of said firebox for controlling the size and intensity of the fire therein, and an exit passageway through said drawer remote from said front access door and said top surface to conduct heat and smoke from the interior of said firebox into the interior of said housing even while said drawer is partially moved outwardly of said second opening of said lower portion of said housing, said planar cover serving as a second cooking means when said drawer is moved to any of its outward positions.

2. The apparatus of claim 1 wherein said damper means is movably mounted on said access door.

3. The apparatus of claim 1 which additionally comprises means located in said upper portion of said housing for access to the upper surface of said perforated shelf.

4. The apparatus of claim 1 wherein said access door is mounted to the front of said drawer and said damper means is movably mounted on said access door.

5. The apparatus of claim 1 wherein said access door is mounted to the front of said drawer and, when said drawer is fully inserted into said housing, said access door closes said second opening.

6. The apparatus of claim 1 wherein said housing is supported on a frame having an axle and two wheels mounted transverse to one end of said housing, a trailer hitch means on the other end of said housing adpted to be mounted to a powered vehicle, and a depending leg mounted to said hitch means for ground engagement when said apparatus is at rest.

7. The apparatus of claim 6 wherein said apparatus includes means mounting said wheels for rotatable movement, said wheels being detachable from said mounting means, a pair of fixed legs being connectable to said mounting means when said wheels are detached therefrom.

8. The apparatus of claim 6 wherein said trailer hitch means comprises a tow bar extending laterally from said housing other end, said tow bar being positioned generally parallel to the lengthwise horizontal axis of said housing, and a trailer hitch mounted to the free outer end of said tow bar.

9. The apparatus of claim 1 wherein said drawer is generally box-shaped and said front access door is movably mounted thereto, and includes, a rear end wall, a bottom surface, and two side walls, said front access door including a handle and said damper means being located at the bottom of said access door, said damper means including a rectangular aperture through said door and a slideable closure movably mounted therewithin; said rear end wall including said exit passageway for passage of heat and smoke into said smoking space in said housing below said perforated shelf; an elongated arm having one end affixed to said rear end wall adjacent said bottom of said drawer and the other end of said arm being slideably mounted on a horizontal rail below said bottom wall and inside said housing, said arm being oriented in the direction of travel of said drawer.

10. The apparatus of claim 5 wherein said arm is elongated in the direction of travel of said drawer whereby said drawer is disposed spacedly outwardly from said housing while remaining attached to said rail to permit cleaning of said drawer and of the internal wall defining said housing lower portion.

11. The apparatus of claim 1 wherein said drawer is slideably attached to an elongated horizontal rail affixed to said housing in said lower portion below said firebox and oriented parallel to the direction of travel of said drawer.

12. The apparatus of claim 11 wherein said drawer is selectively movable from one extreme wherein said front access door is substantially flush with said housing to the other extreme wherein the entire drawer is exterior of said housing while remaining attached to said rail.

13. The apparatus of claim 12 wherein said drawing additionally comprises a rear end wall through which said exit passageway extends, said rear end wall being substantially continuous with said top wall.

14. The apparatus of claim 13 wherein an arm having roller means for attachment to said horizontal rail is affixed to said rear end wall.

* * * * *